DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1346

T882,017
COATING SUBSTRATES WITH POLYOLEFINS

Charles H. Coney, 2008 Canterbury Road,
Kingsport, Tenn. 37660

Filed May 13, 1970, Ser. No. 36,996
Int. Cl. B44d *1/34*
U.S. Cl. 117—49
No Drawing. 10 Pages Specification

The process of forming a polyolefin deposit or coating on a substrate which comprises: (A) forming a solution of a polyolefin in a solvent therefor (such as polyethylene or polypropylene) heated to a temperature sufficient to bring about solution of the polyolefin therein, progressively cooling the solution to the quasi-solidification point and simultaneously adding to the solution a volatile liquid which is a non-solvent for the polyolefin, and, during addition of the non-solvent, subjecting the mixture to constant agitation and a high degree of shear, whereby minute discreet polyolefin particles are formed as a dispersion in the mixture of solvent and non-solvent; (B) heating the substrate to be coated to a temperature at or above the fusion temperature of the polyolefin; and (C) spraying the polyolefin dispersion onto the heated substrate, whereby the volatile components of the dispersion are evaporated and the discreet particles of polyolefin are deposited on and fused into a continuous coating on the substrate. The process is particularly useful in preparing protective and easily slipable coatings on the surface of a wide variety of metal objects such as steel panelling, construction members and other objects where a protective and low-friction coating is required.